Oct. 22, 1957 R. H. McINTOSH 2,810,144
BROILER GRATE SCRAPERS
Filed Aug. 27, 1952
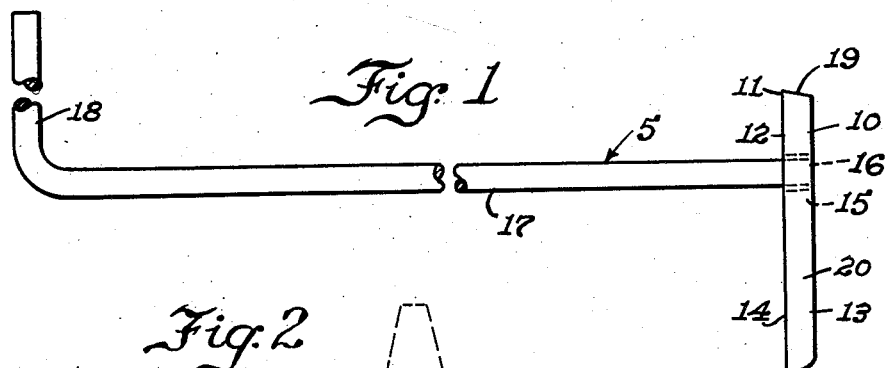
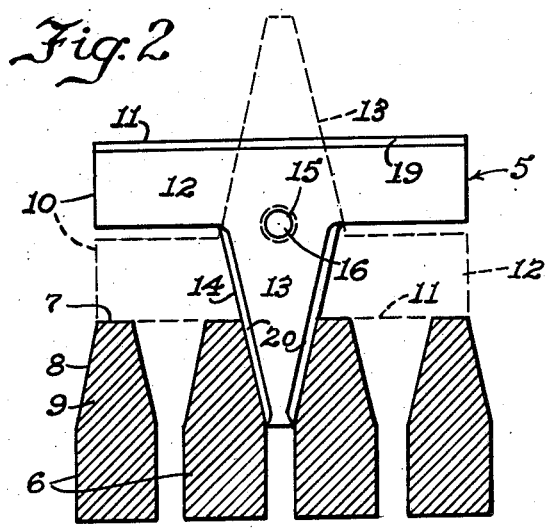
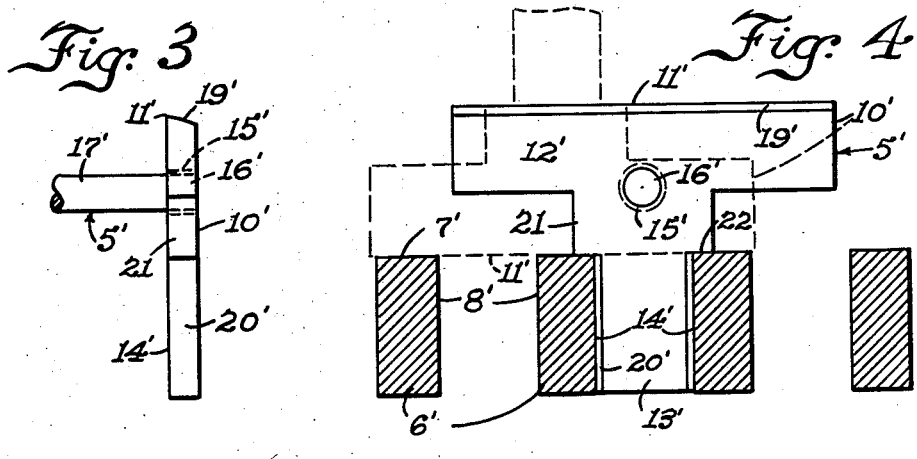
Inventor
Ray H. McIntosh
Atty United States Patent Office 2,810,144
Patented Oct. 22, 1957

2,810,144

BROILER GRATE SCRAPERS

Ray H. McIntosh, Rockford, Ill.

Application August 27, 1952, Serial No. 306,687

1 Claim. (Cl. 15—105)

This invention relates to broiler grate scrapers especially designed and adapted for use on large broilers in restaurant kitchens where the grate bars become thickly encrusted and charred and should be scraped thoroughly clean daily.

The principal object of my invention is to provide scrapers which, when the scraping blade is turned one way, can be used to scrape the flat top surfaces of the bars clean, and which, when turned the other way, can be used to scrape the flat side surfaces, a handle grip on the free end of the long rod forming the handle extending upwardly at right angles when the blade is in one position and downwardly when in the other, so that the operator can tell by the position of the handle grip when the blade is properly disposed for the one or the other kind of scraping.

The scraper of my invention is also designed with a view to providing sufficient stock in the blade to allow for sharpening, that being particularly important in so far as that portion of the blade that is used in scraping the sides of the bars is concerned, because for speedier operation it is preferred to have that portion of the blade designed so that it will scrape the sides of two neighboring bars at the same time.

The invention is illustrated in the accompanying drawing, in which—

Fig. 1 is a side view of a broiler grate scraper made in accordance with my invention, an intermediate portion of the handle rod and also of the handle grip being broken away to permit showing the scraper on a larger scale, approximately full size;

Fig. 2 is a front view of the blade showing a number of grate bars in cross-section with the tapered portion of the blade disposed between two neighboring bars as in the operation of scraping the sides thereof, the view also including in dotted lines a showing of how the blade, when reversed, is adapted to be used in scraping the tops of four bars at a time;

Fig. 3 is a side view of another broiler grate scraper made in accordance with my invention, the blade in this case being like that shown in Fig. 4 and the handle rod being broken off to conserve space in the drawing, and Fig. 4 is a view like Fig. 2 showing the blade of Fig. 3 in front elevation in use between two bars of a different make of broiler scraping the sides of two neighboring bars at the same time, and indicating in dotted lines how the blade, when inverted serves to scrape the tops of three bars at a time.

Similar reference numerals are applied to corresponding parts throughout these views.

Referring first to Figs. 1 and 2, the broiler grate scraper indicated generally by the reference numeral 5 is for use with two well-known makes of broilers having spaced parallel grate bars like those indicated in section at 6, flat on the top 7 and having flat inclined sides 8 on the tapered upper portions 9. The scraping blade 10 is generally T-shaped and has a straight edge 11 on the outer side of the rectangular cross-portion 12 of the T for use in scraping the flat tops 7 of the bars and has the leg portion 13 of the T tapered toward its outer end and providing on the opposite sides thereof the converging edges 14 which have the same included angle as that defined between the inclined sides 8 of two neighboring bars 6 of the broiler grate so as to be suitable for scraping these side surfaces. A center hole 15 is tapped for threaded engagement therein of the threaded end 16 of an elongated flexible resilient handle rod 17 that is generally about 18 inches long to permit reaching easily into the broiler to the far ends of the bars 6 that extend in a fore and aft direction in the broiler. The rod is at right angles to the plane of the blade so that it is in the same relationship to the blade when the blade is being used either of the two ways for which it is designed. At the end remote from the blade 10 the handle rod 17 is bent upwardly at right angles to provide a handle grip 18 of suitable length. In other words, the handle grip 18 is up when the tapered tooth portion 13 of the blade 10 is down, as when scraping the sides of neighboring bars, as shown in Fig. 2, and the handle grip 18 is down when the blade 10 is reversed for scraping the tops of the bars, as indicated in dotted lines in Fig. 2. There is, therefore, no guess-work on the part of the operator as to the exact position of the blade, because the handle grip 18 serves as an indicator.

In operation, the straight edge 11 is defined by grinding the bevel 19 and this edge is, therefore, designed to be effective mainly as the blade is pressed down and pulled toward the operator along the flat top surfaces 7 of the bars 6. The converging edges 19 are defined by grinding the bevels 20 so that these edges are also effective mainly as the blade 10 is pressed down and pulled toward the operator in scraping the inclined sides 8 on two neighboring bars. The flexibility and resilience of the rod 17 enables maintaining fairly even operating pressure on the blade 10 and that, I find, is very important for good and efficient operation. The length of the leg portion 13 and its width across its upper portion are such that there is sufficient stock in the blade to permit sharpening it many times to keep it operating most efficiently, without having the edges 14 too closely spaced for operation simultaneously on the sides of two neighboring bars.

The scraper indicated generally by the reference numeral 5' in Figs. 3 and 4 is for use with another well-known make of broiler that has spaced parallel bars 6' of rectanglar section providing flat top surfaces 7' and parallel flat side surfaces 8'. In this scraper the blade 10' is also generally T-shaped and has a straight edge 11 on the outer side of the cross-portion 12' of the T and has parallel straight scraping edges 14' on the sides of the lower portion of the leg portion 13' that is narrow in relation to the upper portion 21 of the leg portion of the T, whereby square shoulders 22 are defined at the upper ends of edges 14'. These shoulders 22 are adapted to rest on top of neighboring bars 6' when the sides 8' of these neighboring bars are being scraped, as shown in full lines in Fig. 4. When the blade is inverted the straight edges 11' can be used to scrape the tops 7' of these neighboring bars, as indicated in dotted lines in Fig. 4. Here again the ground bevels at 19' and 20', defining the scraping edges 11' and 14' respectively, are in the same direction and make the scraping edges effective mainly as the blade 10' is pressed down and pulled toward the operator. The same handle rod and handle grip are provided for this scraping blade as for the other one, the same having an end portion of the handle rod 17' threaded as at 16' and threaded in the tapped hole 15' in the center of the blade 10' and the other end portion 18 is bent up as in Fig. 1 to provide a handle grip.

The operation of this blade 10' is so closely similar to that of blade 10 nothing further need be stated in regard to it.

It is believed the foregoing description conveys a good understanding of the objects and advantages of my invention. The appended claim has been drawn to cover all legitimate modifications and adaptations.

I claim:

For use with a plurality of spaced substantially parallel broiler grate bars, the top and side surfaces of which require scraping for cleaning, in combination, a scraper comprising a generally T-shaped blade, the cross-portion of which defines by its longitudinal edge on that side away from the leg portion of the T a scraping edge long enough for scraping simultaneously the coplanar top surfaces on a plurality of neighboring ones of said bars, the leg portion of the T being of a predetermined width in relation to the spacing of said bars and defining on its opposed longitudinal edges scraping edges for scraping simultaneously the adjacent side surfaces on two neighboring ones of said bars when entered therebetween, and an elongated flexible and resilient handle rod attached at one end to the middle portion of said blade substantially at right angles thereto, the handle being of a suitable length in relation to the length of said broiler grate bars and having a handle grip on the outer end portion thereof.

References Cited in the file of this patent

UNITED STATES PATENTS

| | | |
|---|---|---|
| 624,627 | Clark | May 9, 1899 |
| 1,362,336 | Maxwell | Dec. 14, 1920 |
| 2,291,015 | Anderson | July 28, 1942 |

FOREIGN PATENTS

| | | |
|---|---|---|
| 3,716 | Great Britain | Mar. 23, 1885 |